United States Patent
Mohanty et al.

(10) Patent No.: US 8,306,581 B2
(45) Date of Patent: Nov. 6, 2012

(54) SLEEP OPTIMIZATION FOR MOBILE DEVICES IN A WIRELESS NETWORK

(75) Inventors: Shantidev Mohanty, Hillsboro, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 12/955,060

(22) Filed: Nov. 29, 2010

(65) Prior Publication Data

US 2011/0070849 A1 Mar. 24, 2011

Related U.S. Application Data

(63) Continuation of application No. 11/738,215, filed on Apr. 20, 2007, now Pat. No. 7,860,469.

(60) Provisional application No. 60/918,792, filed on Mar. 19, 2007.

(51) Int. Cl.
*H04M 1/00* (2006.01)

(52) U.S. Cl. .................. 455/574; 455/127.5; 455/343.2; 455/517; 455/418; 455/403

(58) Field of Classification Search ............... 455/127.5, 455/574, 343.2, 517, 418, 403
See application file for complete search history.

(56) References Cited

U.S. PATENT DOCUMENTS

| | | | |
|---|---|---|---|
| 6,073,035 A | 6/2000 | Witter | |
| 6,333,939 B1 | 12/2001 | Butler et al. | |
| 6,353,893 B1 | 3/2002 | Liu et al. | |
| 7,860,469 B2 | 12/2010 | Mohanty et al. | |
| 2004/0033812 A1 | 2/2004 | Matsunaga et al. | |
| 2004/0218556 A1 | 11/2004 | Son et al. | |
| 2006/0029011 A1 | 2/2006 | Etemad et al. | |
| 2006/0030305 A1* | 2/2006 | Lee et al. | 455/418 |
| 2006/0050709 A1 | 3/2006 | Sung et al. | |
| 2006/0079232 A1 | 4/2006 | Omori et al. | |
| 2006/0193296 A1 | 8/2006 | Zhong et al. | |
| 2007/0087767 A1 | 4/2007 | Pareek et al. | |

(Continued)

FOREIGN PATENT DOCUMENTS

WO 2006/016765 A2 2/2006

(Continued)

OTHER PUBLICATIONS

Office Action Received for Chinese Patent Application No. 200880008673.4, Feb. 16, 2012, 9 pages of office Action including 6 pages of English translation.

(Continued)

*Primary Examiner* — Wayne Cai

(74) *Attorney, Agent, or Firm* — Cool Patent, P.C.; Kenneth J. Cool; Joseph P. Curtin

(57) ABSTRACT

Briefly, in accordance with one or more embodiments, a subscriber station in sleep mode is capable of sending and/or receiving traffic during sleep mode without violating the delay requirements of best effort traffic. Moreover, a subscriber station is capable of remaining in sleep and may optionally only be awaken in the event there is data to be transmitted from the base station to the subscriber station and/or from the subscriber station to the base station. By implementing an always sleep and need based wake up arrangement, the power consumption of the subscriber station can be reduced.

19 Claims, 5 Drawing Sheets

U.S. PATENT DOCUMENTS

| | | | |
|---|---|---|---|
| 2007/0201423 A1 | 8/2007 | Laroia et al. | |
| 2007/0248071 A1 | 10/2007 | Hui et al. | |
| 2007/0283075 A1* | 12/2007 | Patton | 710/315 |
| 2008/0031173 A1 | 2/2008 | Zhang et al. | |
| 2008/0084941 A1 | 4/2008 | Mohanty et al. | |
| 2008/0165721 A1 | 7/2008 | Fujii et al. | |
| 2008/0233905 A1 | 9/2008 | Mohanty et al. | |
| 2010/0226302 A1* | 9/2010 | Bar et al. | 370/312 |

FOREIGN PATENT DOCUMENTS

| | | |
|---|---|---|
| WO | 2006/101371 A1 | 9/2006 |
| WO | 2008115813 A1 | 9/2008 |

OTHER PUBLICATIONS

Office Action Received for Japanese Patent Application No. 2009-553819, Mar. 12, 2012, 9 pages of office Action including 4 pages of English translation.

Office Action dated Dec. 15, 2009, in U.S. Appl. No. 11/738,215, 26 pages.

Final Office Action dated Apr. 9, 2010, in U.S. Appl. No. 11/738,215, 28 pages.

Advisory Action dated Jun. 2, 2010, in U.S. Appl. No. 11/738,215, 3 pages.

* cited by examiner

SLEEP OPTIMIZATION FOR MOBILE DEVICES IN A WIRELESS NETWORK

CROSS-REFERENCE TO RELATED APPLICATIONS

The present application claims the benefit of U.S. Provisional Application No. 60/918,792 filed Mar. 19, 2007.

BACKGROUND

In wireless networks, sleep mode is designed to reduce the power consumption by subscriber stations in the network. While in sleep mode, a subscriber station (SS) may alternate between an availability interval (AI) and an unavailability interval (UAI). During an unavailability interval an SS may power down its radio interface(s). On the other hand, during an availability interval, the subscriber station can communicate with the base station to send and/or receive data or management traffic. Thus, a subscriber station may send and/or receive traffic while in a sleep mode. However, the amount of traffic that can be exchanged and the delay associated with it depends on the duration and frequency of the availability interval. This is because the traffic can be exchanged between a subscriber station in sleep mode and a base station only during an availability interval. This is not a problem for real time traffic that is periodic in nature. For real time traffic such as voice over internet protocol (VoIP) traffic, traffic may arrive once in every T seconds. Moreover, the amount of traffic in every T seconds may be generally constant. Therefore, a subscriber station in sleep mode can easily send and/or receive such traffic by aligning its availability intervals to the arrival time of the traffic. Moreover, as the traffic length is more or less constant, the duration of the availability interval may be selected to allow the transfer of the expected amount of traffic.

On the other hand, the support of best effort (BE) traffic in sleep mode may be an issue. Two parameters may be defined to characterize such traffic: traffic load (TL) and delay requirements (DR) of the BE traffic. Based on these two parameters, BE traffic can be broadly classified into the following four groups.

Class A: BE traffic with low TL and less stringent DR
Class B: BE traffic with low TL and stringent DR
Class C: BE traffic with high TL and less stringent DR
Class D: BE traffic with high TL and stringent DR A subscriber station in sleep mode can send and/or receive Class A BE traffic using the AI intervals. However, the subscriber station may not be able to send and/or receive other BE traffic classes using the AI intervals. Thus, the following two issues are considerations for supporting best effort traffic with higher traffic loads and/or stringent delay requirements in sleep mode.

The latency of the BE traffic (Class B and D) should be kept as low as possible. Therefore, waiting to transmit data only during AI may not be ideal, especially when the duration of AI is small. In a scenario where the base station has to send X amount of data to a subscriber station in sleep mode, the base station waits until the next AI of the subscriber station and during the next AI the base station could send only Y (<X) amount of data allowed by the length of AI interval, and waits to transmit the remaining (X-Y) amount of data till the another AI. This increases the delay in sending the total X amount of data. Such delay can be more when the duration of UAI is long.

Uncontrolled growth of the buffered amount of BE traffic at the base station and/or the subscriber station when the subscriber station is in sleep mode should be avoided. Thus, sleep mode should support optional mechanisms for the subscriber station to send and/or receive any amount of traffic during its AI interval. Using such option, a subscriber station in sleep mode could send and/or receive traffic without terminating its sleep mode operation. As a result, the overhead associated with repeated trigger/termination of sleep mode could be reduced, and further power saving at the subscriber station could be increased. A subscriber station in sleep mode could retain the option to terminate its sleep mode to send and/or receive traffic.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 4:
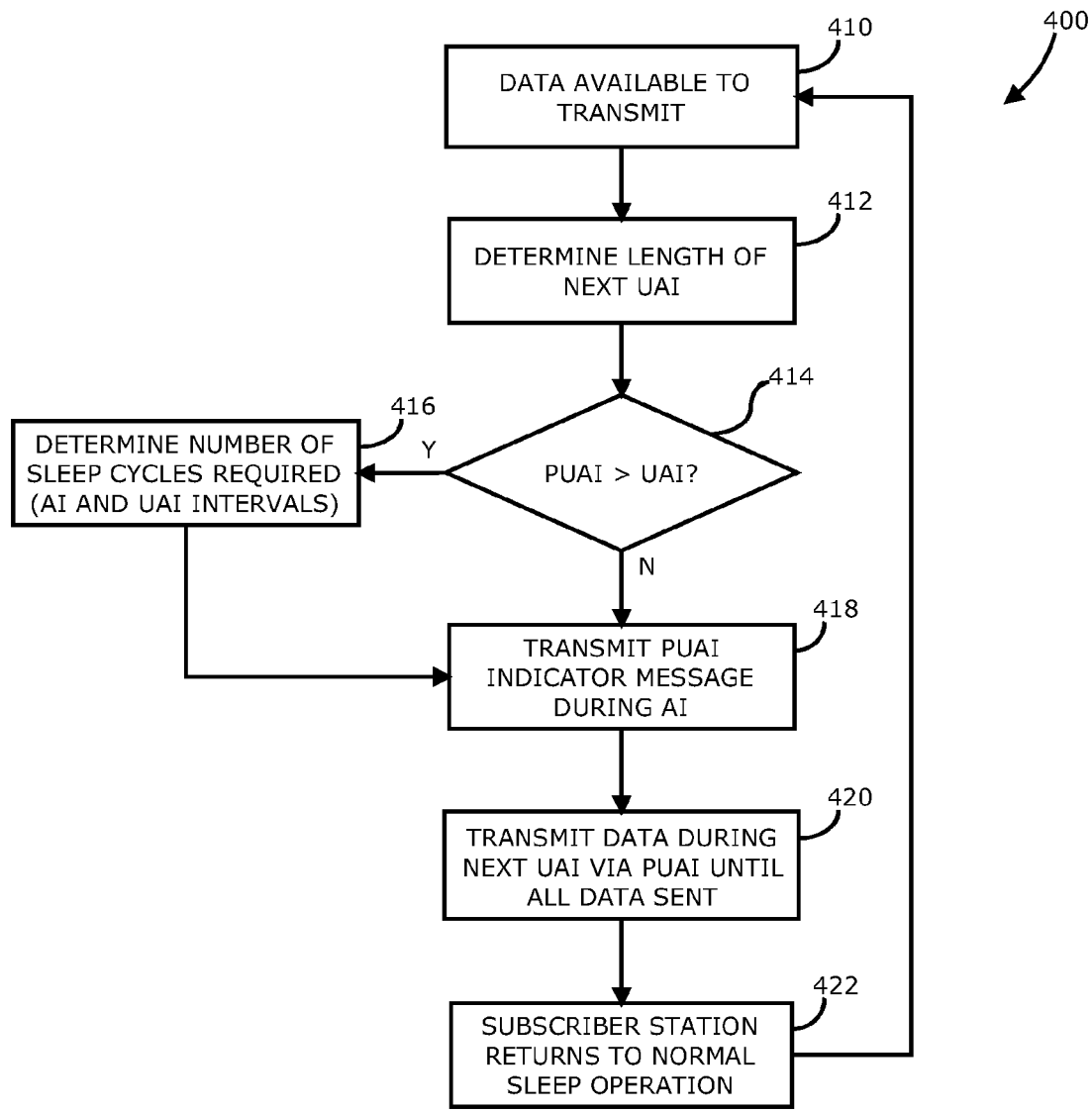
Figure 5:
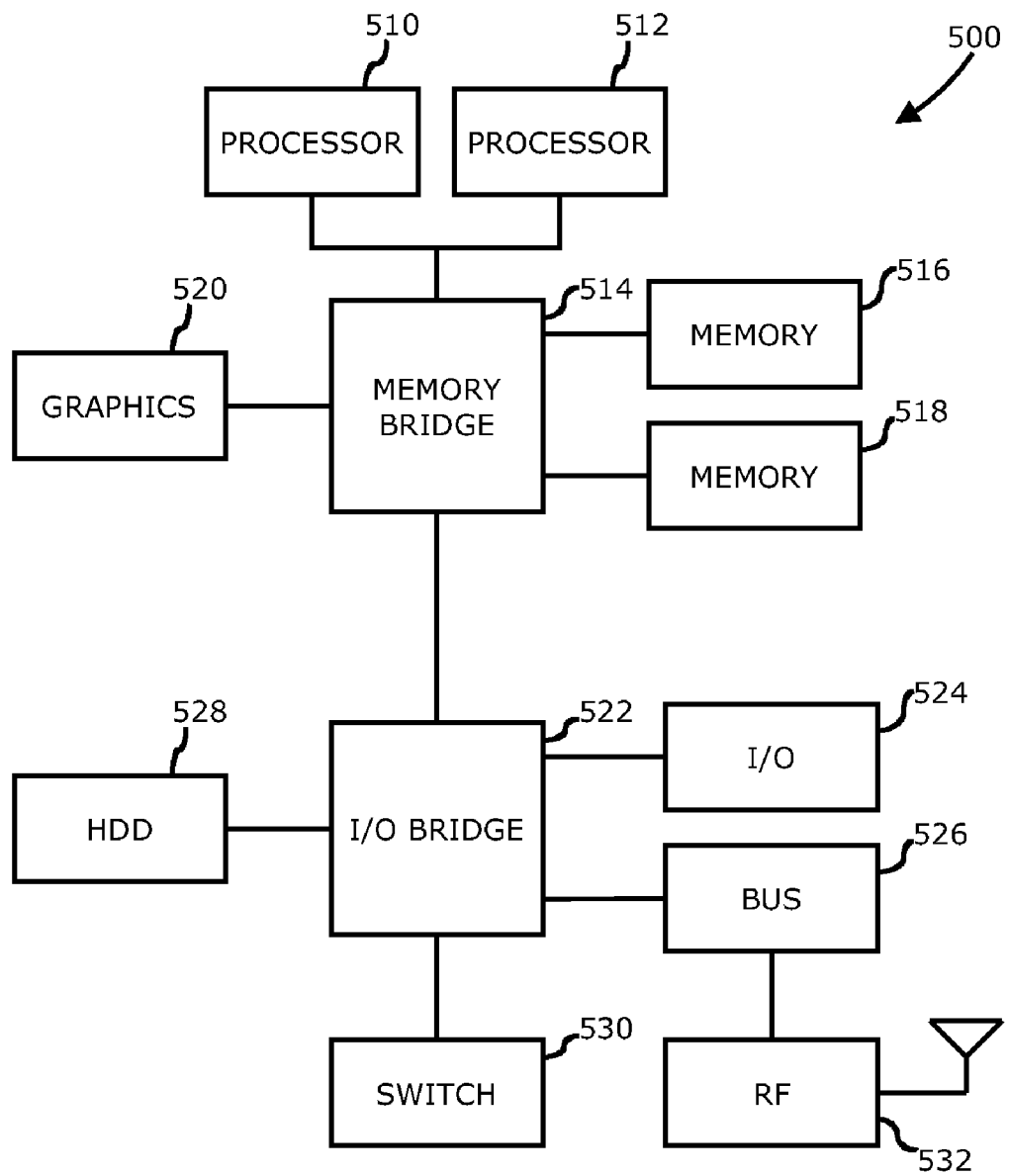

FIG. 4 is a flow diagram of a method for transferring information between a base station and a subscriber station in sleep mode via a pseudo unavailability interval where the pseudo unavailability interval may be longer than the next unavailability interval to accommodate larger amounts of data to be transferred in accordance with one or more embodiments; and FIG. 5 is a block diagram of an information handling system capable of optimizing a sleep mode operation in a wireless network in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
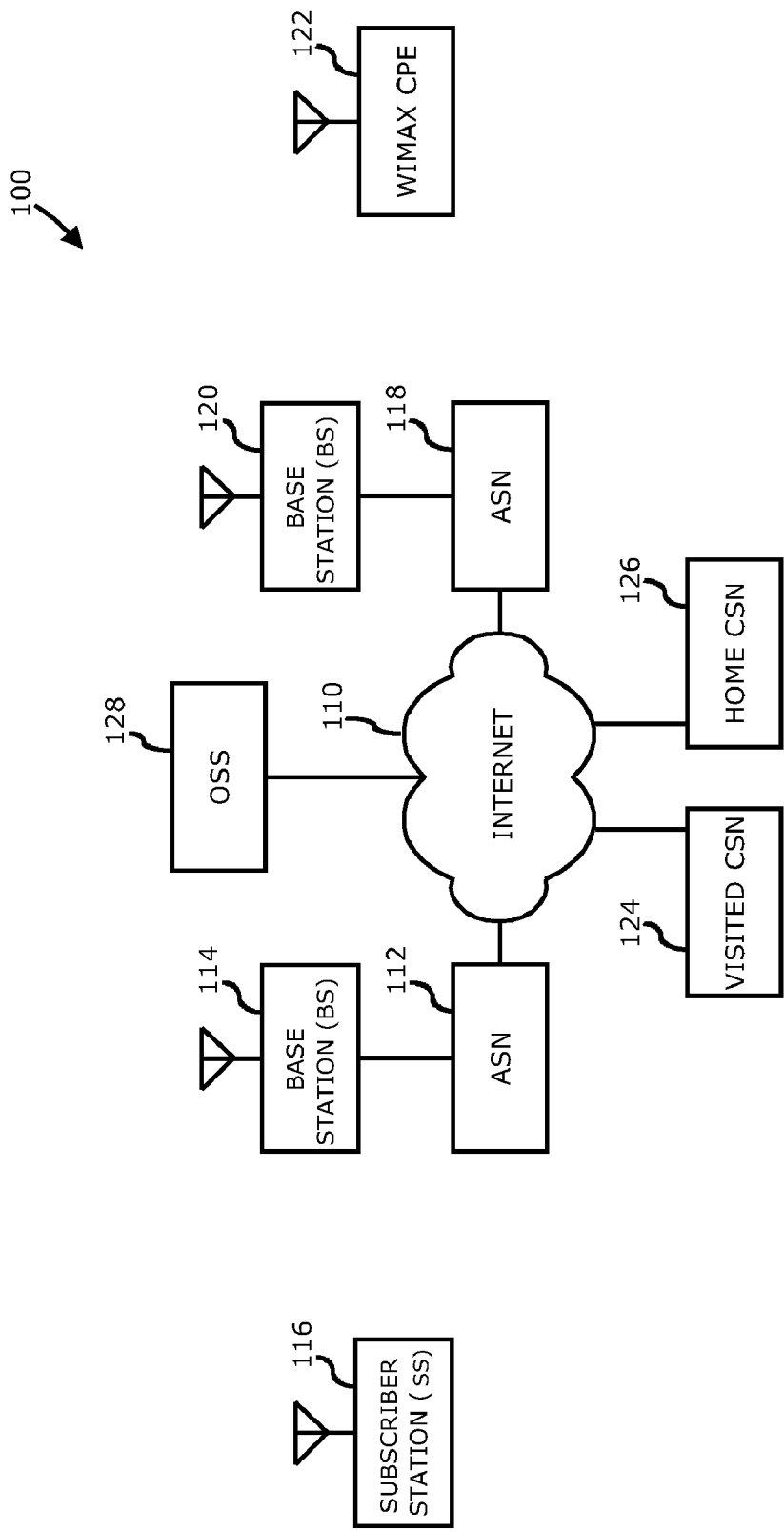
FIG. 1 is block diagram of a wireless network in accordance with one or more embodiments.

Referring now to FIG. 1, a block diagram of a wireless network in accordance with one or more embodiments will be discussed. As shown in FIG. 1, network 100 may be an internet protocol (IP) type network comprising an internet 110 type network or the like that is capable of supporting mobile wireless access and/or fixed wireless access to internet 110. In one or more embodiments, network 100 may be in compliance with a Worldwide Interoperability for Microwave Access (WiMAX) standard or future generations of WiMAX, and in one particular embodiment may be in compliance with an Institute for Electrical and Electronics Engineers 802.16e standard (IEEE 802.16e). In one or more alternative embodiments network 100 may be in compliance with a Third Generation Partnership Project Long Term Evolution (3GPP LTE) or a 3GPP2 Air Interface Evolution (3GPP2 AIE) standard. In general, network 100 may comprise any type of orthogonal frequency division multiple access (OFDMA) based wireless network, and the scope of the claimed subject matter is not limited in these respects. As an example of mobile wireless access, access service network (ASN) 112 is capable of coupling with base station (BS) 114 to provide wireless communication between subscriber station (SS) 116 and internet 110. Subscriber station 116 may comprise a mobile type device or information handling system capable of wirelessly communicating via network 100, for example a notebook type computer, a cellular telephone, a personal digital assistant, or the like. ASN 112 may implement profiles that are capable of defining the mapping of network functions to one or more physical entities on network 100. Base station 114 may comprise radio equipment to provide radio-frequency h(RF) communication with subscriber station 116, and may comprise, for example, the physical layer (PHY) and media access control (MAC) layer equipment in compliance with an IEEE 802.16e type standard. Base station 114 may further comprise an IP backplane to couple to internet 110 via ASN 112, although the scope of the claimed subject matter is not limited in these respects.

Network 100 may further comprise a visited connectivity service network (CSN) 124 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VOIP) gateways, and/or internet protocol (IP) type server functions, or the like. However, these are merely example of the types of functions that are capable of being provided by visited CSN or home CSN 126, and the scope of the claimed subject matter is not limited in these respects. Visited CSN 124 may be referred to as a visited CSN in the case for example where visited CSN 124 is not part of the regular service provider of subscriber station 116, for example where subscriber station 116 is roaming away from its home CSN such as home CSN 126, or for example where network 100 is part of the regular service provider of subscriber station but where network 100 may be in another location or state that is not the main or home location of subscriber station 116. In a fixed wireless arrangement, WiMAX type customer premises equipment (CPE) 122 may be located in a home or business to provide home or business customer broadband access to internet 110 via base station 120, ASN 118, and home CSN 126 in a manner similar to access by subscriber station 116 via base station 114, ASN 112, and visited CSN 124, a difference being that WiMAX CPE 122 is generally disposed in a stationary location, although it may be moved to different locations as needed, whereas subscriber station may be utilized at one or more locations if subscriber station 116 is within range of base station 114 for example. In accordance with one or more embodiments, operation support system (OSS) 128 may be part of network 100 to provide management functions for network 100 and to provide interfaces between functional entities of network 100. Network 100 of FIG. 1 is merely one type of wireless network showing a certain number of the components of network 100, however the scope of the claimed subject matter is not limited in these respects.

Figure 2:
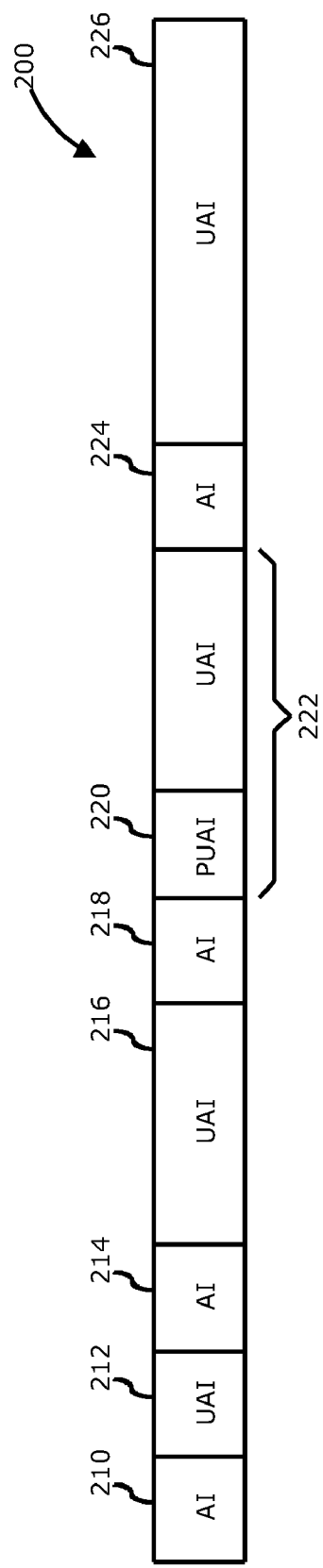
FIG. 2 is a timeline diagram showing the utilization of a pseudo unavailability interval during which a subscriber station may send and/or receive traffic during a sleep mode in accordance with one or more embodiments.

Referring now to FIG. 2, a timeline diagram showing the utilization of a pseudo unavailability interval during which a subscriber station may send and/or receive traffic during a sleep mode in accordance with one or more embodiments will be discussed. As shown in FIG. 2, timeline 200 may represent a sleep mode operation for subscriber station 116 of FIG. 1 in which time may increase from left to right along timeline 200. A sleep mode for subscriber station 116 may define a power saving mechanism to minimize power consumption of subscriber station 116 and to decrease usage of air interface resources utilized by subscriber station 116 while maintaining communication of subscriber station 116 with network 100. In one or more embodiment, such a sleep mode may be in compliance with an IEEE 802.16e standard, although the scope of the claimed subject matter is not limited in this respect.

During a sleep mode, timeline 200 may comprise one or more availability intervals (AI) such as availability interval 210, availability interval 214, availability interval 218, availability interval 224, and so on. Likewise, during a sleep mode, timeline 200 may comprise unavailability intervals (UAI) such as unavailability interval 212, unavailability interval 216, unavailability interval 222, unavailability interval 226, and so on. While in a sleep mode, subscriber station 116 may alternate between such periods of an availability interval and an unavailability interval. During an unavailability interval, subscriber station 116 may power down its radio interface, for example to conserve power consumption. During an availability interval, subscriber station 116 may power up its radio interface and listen for traffic indicator messages that may be sent by base station 114 to indicate the presence of traffic. The presence or absence of traffic for subscriber station 116 while in a sleep may be indicated by a traffic indicator message, which in one or more embodiments may be referred to as MOB_TRF-IND, which may be received by subscriber station 116 during an availability interval. In one or more embodiments, the duration of availability intervals such as AI 210, AI 214, AI 218, and/or AI 224 may be constant. In one or more embodiments, the duration of unavailability intervals such as UAI 212, UAI 216, and/or UAI 222 may double for subsequent unavailability intervals up to a maximum value. Alternatively, the duration of unavailability intervals may remain constant for successive unavailability intervals. In one or more embodiments, the duration of first availability interval such as AI 210 may be denoted as Initial UAI, and the duration of an unavailability interval at a particular time may given by:

$$UAI = \min(2 * (\text{Previous UAI}), \text{Final UAI base} * 2^{(\text{Final UAI exponent})}) \quad (1)$$

Where Final UAI base is the final UAI base and Final UAI exponent is the final UAI exponent. It may be noted that when Final UAI base=Initial UAI and Final UAI exponent=0, the duration of UAI is constant.

In one or more embodiments, when subscriber station 116 is in a sleep mode, subscriber station 116 may power down during an unavailability interval. During an availability interval, subscriber station may wake up by powering up to listen for traffic indicator messages, such as MOB_TRF-IND, during the availability interval. If subscriber station 116 receives a traffic indicator message, subscriber station 116 may respond as follows.

If the traffic indicator message indicates that there is no traffic for the subscriber station 116, then subscriber station 116 may optionally go back to sleep, that is power down radio resources, after receiving the traffic indicator message.

If the traffic indicator message indicates that there is traffic for subscriber station 116, then subscriber station 116 may receive downlink (DL) transmissions from base station 114 in the same and/or similar manner as in a state of normal operation during a remaining portion of the present availability interval. In one or more embodiments, normal operation may be defined as a state where subscriber station 116 is not in a sleep mode. In one or more embodiments, if subscriber station 116 receives a positive traffic indicator message, the operation subscriber station after an unavailability interval may depend on a traffic triggered wakening flag such as traffic_triggered_wakening_flag (TTW). In one or more embodiments, such a traffic triggered wakening flag may be negotiated between base station 114 and subscriber station 116 prior subscriber station 116 entering a sleep mode.

In one or more embodiments, if the traffic triggered wakening flag is set to zero (TTW=0), subscriber station 116 does not deactivate sleep mode after receiving MOB-TRF-IND message with positive traffic indication. Therefore, subscriber station 116 may continue its sleep mode as usual. Such an option may allow subscriber station 116 to receive traffic during an availability interval without disrupting the sleep mode operation of subscriber station 116. This option enables subscriber station 116 to receive lighter traffic or more delay tolerant traffic without terminating sleep mode. When the traffic triggered wakening flag is set to zero, subscriber station 116 may receive traffic during an availability interval.

In one or more embodiments, if the traffic triggered wakening flag is set to one (TTW=1), subscriber station 116 may deactivate sleep mode. Therefore, sleep mode of subscriber station 116 is terminated, and subscriber station enters a normal mode of operation after receiving the MOB-TRF-IND message with positive traffic indication.

In one or more embodiments, traffic may be communicated between subscriber station 116 and base station 114 during a sleep mode without requiring subscriber station 116 to exit sleep mode and communicate in a normal mode. In such embodiments, subscriber station 116 may utilize a pseudo unavailability interval (PUAI) such as PUAI 220 of FIG. 2. As shown in FIG. 2, a pseudo unavailability interval 220 may comprise at least a portion of an unavailability interval 222 that may be used, as needed, by subscriber station 116 to send and/or receive traffic without exiting and/or modifying sleep mode operation.

In one or more embodiments as shown in FIG. 2, pseudo unavailability interval 220 may comprise a portion of unavailability interval 222. Thus, in one or more embodiments, the aggregate duration of PUAI 220 and UAI 222 may comprise a duration of a single unavailability interval that may otherwise exist in the absence of PUAI 220, for example as determined by Formula (1), above, for calculating the duration of an unavailability interval as previously discussed. While subscriber station 116 is in a sleep mode, during a pseudo unavailability interval such as PUAI 220, base station 114 may send traffic to subscriber station 116 and/or subscriber station 116 may send traffic to base station 114. In one or more embodiments, base station 114 may optionally specify the use of a pseudo unavailability interval and/or the duration of the pseudo unavailability interval. One example of how base station 114 may specify such a pseudo unavailability interval is shown in Table 1.

TABLE 1

| PUAI message format. | | |
| --- | --- | --- |
| Syntax | Size | Note |
| PUAI Flag | 1 bit | Indicate the presence or absence of PUAI |
| If (PUAI Flag) { | | |
| PUAI Length | M bits | Length of PUAI interval |
| } | | |

As shown in Table 1, a PUAI message may contain a one bit PUAI Flag that indicates the presence or absence of a pseudo unavailability interval. If the PUAI Flag is positive indicating the presence of a PUAI, the PUAI message may indicate the length of the pseudo unavailability interval, for example by PUAI Length. In the event a pseudo unavailability interval is specified, one or more of the following techniques may be utilized to determine the duration of a next unavailability interval.

Method 1: The duration of a next UAI=duration of a current UAI. In one or more embodiments, Method 1 may be utilized to avoid and/or minimize an increase of the duration of the unavailability interval, for example if it is expected that additional traffic may be sent to subscriber station 116 during sleep mode.

Method 2: The duration of a next UAI may be calculated using Formula (1) or variations thereof. In one or more embodiments, Method 2 may be utilized if the probability of further traffic to or from subscriber station 116 is generally lower and/or the traffic does not have stringent delay requirements. Furthermore, in one or more embodiments Method 2 may be utilized to maximize and/or increase power saving.

Method 3: The duration of a next UAI=X*duration of a current UAI, where 0<X<1. In one or more embodiments, Method 3 may be utilized if more traffic is exists and/or is expected to be received by and/or sent by subscriber station 116, and/or where the traffic has stringent delay requirements. In such embodiments, the duration of the next unavailability interval may be successively decreased, and the duration of the next pseudo unavailability interval may be successively increased.

Method 4: The relationship between the duration of a current UAI and a next UAI may be based at least in part on the type of traffic being transmitted and/or expected to be transmitted by or received by subscriber station 116, for example based on the traffic load and/or delay requirements of the traffic.

Method 5: Duration of a next UAI may be independent of a duration of a current UAI. In one or more embodiments, Method 5 may be utilized to artificially reset the sleep mode operation with an UAI of an arbitrary duration that is suitable to the current and/or expected traffic pattern. Method 5 may also be utilized to accommodate a change in traffic pattern that may occur in the middle of sleep mode operation. For example, when a sleep mode is initiated the parameters for a UAI duration may be defined based on an existing and/or predicted traffic pattern for subscriber station 116. In the event the traffic patterns change, subscribe station 116 may modify the UAI duration parameters. Such change may comprising selecting the duration of the next UAI to accommodate the new traffic patterns.

In one or more embodiments, the selected method to determine the duration of a next unavailability interval following a pseudo unavailability interval may be negotiated between base station 114 and subscriber station 116 during initiation of sleep mode prior to entry of subscriber station 116 into sleep mode. Alternatively, the method to determine the duration of a next unavailability interval may be exchanged between base station 114 and subscriber station 116 as a part of PUAI message as shown in Table 1, above. In the event a PUAI message is utilized to exchange such information pertaining to the duration of a next unavailability interval, the format for such a PUAI message may be as shown in Table 2.

TABLE 2

PUAI message format indicating the method used to determine the length of a next unavailability interval.

| Syntax | Size | Note |
| --- | --- | --- |
| PUAI Flag | 1 bit | Indicate the presence or absence of PUAI |
| If (PUAI Flag) { | | |
| PUAI Length | M bits | Length of PUAI interval |
| } | | |
| Next UAI duration method | 3 bits | Specifies the method used to determine the duration of UAI following the use of PUAI. 000 to 101 are used for Method 1 to Method 4, respectively. 110-111 are reserved for future use. |
| If (Next UAI duration method == 3) { | | |
| X | N bits | Specifies X used in Method 3 |
| } | | |
| If (Next UAI duration method == 4) { | | |
| For future definition | For future definition | Specifies the relationship between current UAI and next UAI for Method 4 |
| } | | |
| If (Next UAI duration method == 5) { | | |
| Next UAI duration | R bits | Specifies the duration of next UAI in terms of number of frames for Method 5 |
| } | | |

In one or more embodiments, if the method utilized to determine the duration of a next UAI after the use of a PUAI is negotiated between base station 114 and subscriber station 116 at sleep initiation, the format of the message part, SLP-REQ, sleep sub header, and/or sleep extended sub header, that specifies the duration of a next UAI may be the same or similar to a corresponding section in Table 2. In one or more embodiments, the maximum length of PUAI 220 may be the length of a current UAI 222. In such a case, PUAI 220 is not extended beyond the duration of a current UAI 222. Thus, in such embodiments the sleep operation of subscriber station is affected for the duration of the current UAI via implementation of a PAUI, and the sleep operation reverts to a normal sleep mode after the end of the current UAI. In the event subscriber station 116 still has more traffic to send and/or receive after the end of the current UAI, in one or more embodiments base station 114 and subscriber station 116 may exchange another PUAI message during the next AI and use a PUAI during the next UAI to continue traffic exchange. Such a process of using multiple successive PUAIs may continue until subscribe station 116 does not have any further traffic to send and/or receive. Such PUAI usage may optionally be initiated either by base station 114 or the subscriber station 116. Base station 114 may initiate the utilization of one or more PUAIs if base station 114 has downlink traffic for subscriber station 116, or subscriber station 116 may initiate the utilization of one or more PUAIs if subscriber station 116 has uplink traffic to transmit to base station 114. In such arrangements, once base station 114 and/or subscriber station 116 complete exchanging the traffic, subscriber station 116 may return to a normal sleep mode operation automatically. Therefore, in such embodiments, there may be no need to terminate and then reinitiate the sleep mode since subscriber station 116 may remain in sleep mode during the exchange of traffic via one or more PUAIs. However, these are merely example arrangements of the utilization of one or more PUAIs, and the scope of the claimed subject matter is not limited in these respects.

In one or more embodiments, if the PUAI needs to be extended beyond one or more UAIs, the repeated use of a PUAI message during multiple AI, may increase the signaling load. Thus, in one or more embodiments, the length of a PUAI may be greater than the length of the next UAI. In such embodiments, the PUAI may span more than one UAI and/or AI durations. When this option is selected, the PUAI message may be used to specify the number of sleep cycles, that is the number of UAI and/or AI intervals for which the sleep operation is suspended. Thus, instead of alternating between the AI and UAI intervals, while in sleep mode subscriber station 116 remains available to send and/or receive data and/or management traffic. Once the specified number of UAI intervals and/or AI intervals scheduled for PUAI are exhausted, the sleep operation of subscriber station 116 may be resumed automatically. As a result, the signaling overhead to transmit the PUAI indication and sleep termination and initiation are reduced and/or eliminated. When the PUAI indication flag is positive, two possibilities may occur. In one case, the PUAI duration may be less than or equal to the next UAI. In another case, the PUAI duration may not be limited by the duration of the next UAI. One embodiment for a PUAI format to accommodate the two cases is shown in Table 3.

TABLE 3

PUAI message format when the PUAI duration can be larger than next UAI.

| Syntax | Size | Note |
| --- | --- | --- |
| PUAI Flag | 1 bit | Indicate the presence or absence of PUAI |
| PUAI Type | 1 bit | 0: PUAI length is less than or equal to the next UAI 1: PUAI length is not restricted by the duration of next UAI can extend multiple UAI and AI |
| If (PUAI Flag) && (!PUAI Type) { | | |
| PUAI Length | M bits | Length of PUAI interval |
| } | | |
| Else if (PUAI Flag) && (PUAI Type) { | | |
| PUAI Length | N bits | N is the number of UAI and AI cycles that constitutes PUAI duration. After N number of UAI and AI cycles, the MS automatically returns to sleep operation. |
| } | | |

TABLE 3-continued

PUAI message format when the PUAI duration can be larger than next UAI.

| Syntax | Size | Note |
| --- | --- | --- |
| Next UAI duration method | 3 bits | Specifies the method used to determine the duration of UAI following the use of PUAI. 000 to 101 are used for Method 1 to Method 4, respectively. 110-111 are reserved for future use. |
| If (Next UAI duration method == 3) { | | |
| X | N bits | Specifies X used in Method 3 |
| } | | |
| If (Next UAI duration method == 4) { | | |
| For future definition | For future definition | Specifies the relationship between current UAI and next UAI for Method 4 |
| } | | |
| If (Next UAI duration method == 5) { | | |
| Next UAI duration | R bits | Specifies the duration of next UAI in terms of number of frames for Method 5 |
| } | | |

Table 3 illustrates one embodiment to accommodate the two cases, however in other embodiments other PUAI formats may be utilized to extend the PUAI beyond next UAI, and the scope of the claimed subject matter is not limited in this respect. The duration of a next UAI upon the resumption of sleep operation may be indicated using any one or more of Method 1 through Method 5 as discussed, above for both cases, for example the case where the PUAI is limited by the duration of the next UAI and/or when the PUAI is not limited by the duration of the next UAI, and the scope of the claimed subject matter is not limited in these respects.

In one or more embodiments, the PUAI message may be transmitted by base station 114 in the downlink from base station 114 to subscriber station 116. Alternatively, the PUAI message may be transmitted by subscriber station 116 in an uplink from subscriber station 116 to base station 114. In the downlink, base station 114 is capable of utilizing one or more of the following mechanisms to transmit the PUAI message to subscriber station 116 while subscriber station 116 is in a sleep mode.

MOB_TRF-IND message: Base station 114 sends MOB_TRF-IND message during an AI interval of subscriber station 116 while subscriber station 116 is in sleep mode. Base station 114 sends the PUAI message as a part of this MOB_TRF-IND message.

PUAI sub-header: Base station 114 appends the PUAI message to other media access control (MAC) messages using a PUAI sub-header. In one or more embodiments, such sub-headers may be in compliance with an IEEE 802.16e standard. The PUAI sub-header method may be utilized for example if base station 114 has other MAC messages to send to subscriber station.

Separate MAC management message: In the event that base station 114 does not have an opportunity to piggyback the PUAI message onto other MAC messages as a PUAI sub-header, base station 114 optionally may send the PUAI message as a separate MAC management message.

Portion of the Generic MAC Header: MAC messages sent by base station 114 to subscriber station typically have a Generic MAC Header (GMH). A portion of the GMH, for example a few bits in the GMH, optionally may be utilized by base station 114 to convey the PUAI message. Since a portion of the GMH may be utilized, in one or more embodiments the entire PUAI message may not be sent using this method. In such embodiments, a more concise PUAI message format may be defined for this purpose. For example, one bit in the GMH may be utilized to indicate if a particular message is the last one for subscriber station. If so indicates, subscriber station 116 may return to sleep after receiving a message with positive indication in this bit.

For usage of one or more of the above downlink mechanisms, base station 114 may implement the following method in one or more embodiments. If several subscriber stations 116 are being woken up from sleep at the same time, or nearly the same time, base station 114 may insert the identifications (IDs) of such subscriber stations 116 into a single traffic indicator message (TRF_IND) in such a manner that the overhead may be highly amortized among several subscriber stations 116 with fewer and/or a single message while maintaining reliability of communication and management. If a subscriber station 116 is already currently awake and base station 114 wants to extend the awake time of the subscriber station, base station 114 may implement any one or more of a PUAI sub-header, a separate MAC management message, and/or the Generic MAC Header as indicated above, or combinations thereof.

Likewise, in one or more embodiments, for the uplink subscriber station 116 may implement any one or more of the following mechanisms to transmit a PUAI message to base station 114.

PUAI sub-header: Subscriber station 116 appends the PUAI message to other MAC messages using a PUAI sub-header. A PUAI sub-header may be utilized when subscriber station 116 has other MAC messages to send to base station 114.

Separate MAC management message: In the event that subscriber station 116 does not have an opportunity to piggyback the PUAI message onto other MAC messages, subscriber station 116 optionally may send the PUAI message as a separate MAC management message.

Portion of the Generic MAC Header: MAC message sent by subscriber station 116 to base station 114 typically includes a Generic MAC Header (GMH). A portion of the GMH, such as a few bits in the GMH, may be utilized by subscriber station 116 to convey the PUAI message. In one or more embodiments, the entire PUAI message may not be sent using this method. In such embodiments, a more concise PUAI message format may be defined for this purpose. For example, one bit in the GMH may be utilized to indicate if a particular message is the last one by subscriber station 116. Subscriber station 116 may return to sleep after sending a message with positive indication in this bit.

The above downlink and uplink mechanisms for transmitting PUAI information are merely example methods, and other methods optionally may be utilized by base station 114 and/or subscriber station 116 to convey the PUAI message and/or a more concise format to convey a subset of information conveyed by the PUAI message. Thus, the scope of the claimed subject matters is not limited in these respects.

Figure 3:
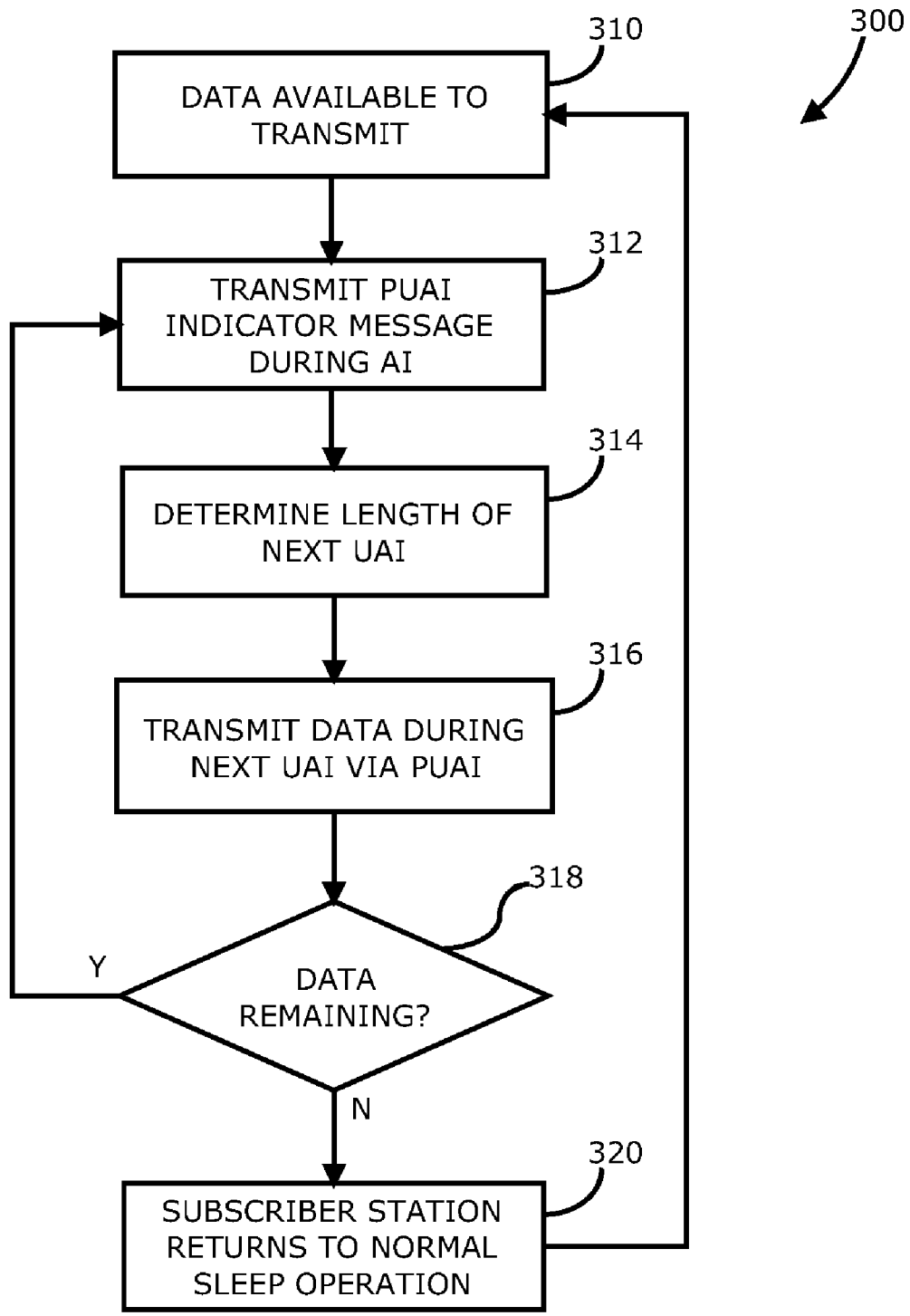
FIG. 3 is a flow diagram of a method for transferring information between a base station and a subscriber station in sleep mode via a pseudo unavailability interval in accordance with one or more embodiments.

Referring now to FIG. 3, a flow diagram of a method for transferring information between a base station and a subscriber station in sleep mode via a pseudo unavailability interval in accordance with one or more embodiments will be discussed. FIG. 3 illustrates one particular order of the blocks of method 300, however the order of the blocks may be changed to other orders, and method 300 may comprise more or fewer blocks than shown in FIG. 3, and the scope of the claimed subject matter is not limited in these respects. At block 310, data may be available to be transmitted, for example from base station 114 to subscriber station 116, or from subscriber station 116 to base station 114. Thus, method 300 may be executed by base station 114 or by subscriber station 116, alone or in combination. The device having data to be transmitted may be referred to as the transmitting device, and the device receiving the data to be transmitted may be referred to as the receiving device. Once data is available to be transmitted and/or exchanged, a pseudo unavailability interval (PUAI) indicator message may be transmitted at block 312 to a receiving device during an availability interval (AI) of subscriber station 116 in sleep mode. The PUAI indicator message transmitted at block 312 indicates to the receiving device the intent to transmit information during a next unavailability interval (UAI) of the sleep mode. The PUAI indicator message transmitted at block 312 may also indicate to the receiving device the length of the PUAI needed to transmit the data, and also optionally a method to be used to determine the length of the next UAI as determined at block 314. The length of the next UAI may be determined at block 314, for example as discussed herein, and data may be transmitted during the next UAI via a PUAI at block 316. At the end of the PUAI, a determination may be made at decision block 318 whether there is any additional data remaining to be transferred. In the event there is additional data remaining, the transmitting device may indicate that one or more additional PUAIs will be used to transmit the additional data by sending additional PUAI indicator messages during the next AI at block 312. Method 300 may then continue until there is no remaining data to be transferred, and subscriber station 116 may return to a usual sleep mode operation at block 320. Subscriber station 116 may remain in sleep mode until more data is available to be transmitted at which point method 300 may continue at block 310 to transmit the additional data.

Referring now to FIG. 4, a flow diagram of a method for transferring information between a base station and a subscriber station in sleep mode via a pseudo unavailability interval where the pseudo unavailability interval may be longer than the next unavailability interval to accommodate larger amounts of data to be transferred in accordance with one or more embodiments will be discussed. FIG. 4 illustrates one particular order of the blocks of method 400, however the order of the blocks may be changed to other orders, and method 400 may comprise more or fewer blocks than shown in FIG. 4, and the scope of the claimed subject matter is not limited in these respects. At block 410, data may be available to be transmitted, for example from base station 114 to subscriber station 116, or from subscriber station 116 to base station 114. Thus, method 400 may be executed by base station 114 or by subscriber station 116, alone or in combination. The device having data to be transmitted may be referred to as the transmitting device, and the device receiving the data to be transmitted may be referred to as the receiving device. In the event that data is available to be transmitted at block 410, the length of the next UAI may be determined at block 412, for example using one or more of the methods described herein. A determination may be made at decision block 414 whether the length of the PUAI needed to transmit the data to be transmitted is greater than the length of the next UAI. In the event that the needed PUAI is greater than the next UAI, a determination may be made at block 416 the number of sleep cycles required to implement the needed PUAI, that is the number of repeated AI and UAI intervals. In any event, the PUAI indicator message may be transmitted at block 418 during the next AI. The PUAI indicator message transmitted at block 418 indicates to the receiving device the intent to transmit information during a next unavailability interval (UAI) of the sleep mode. The PUAI indicator message transmitted at block 418 may also indicate to the receiving device the length of the PUAI needed to transmit the data, and also optionally a method to be used to determine the length of the next UAI as determined at block 412. Furthermore, if block 416 is executed, then the PUAI indicator may also indicate the number of sleep cycles needed to accommodate the PUAI. The data to be transmitted may then be transmitted during the next UAI via the PUAI at block 420 until all data has been sent and/or the end of the PUAI has been reached. Subscriber station 116 may then return to a usual sleep operation at block 422, which may happen automatically, and remain in sleep operation until additional data is available to be transmitted at which time method 400 may continue at block 410.

Referring now to FIG. 5, a block diagram of an information handling system capable of optimizing sleep mode operation in a wireless network in accordance with one or more embodiments will be discussed. Information handling system 500 of FIG. 5 may tangibly embody one or more of any of the network elements of network 100 as shown in and described with respect to FIG. 1. For example, information handling system 500 may represent the hardware of base station 114 and/or subscriber station 116, with greater or fewer components depending on the hardware specifications of the particular device or network element. Furthermore, such an information handling system 500 may be arranged to implement the timing and/or flow diagrams of FIG. 2, FIG. 3, and/or FIG. 4, which may be for example embodied as instructions that may be stored on a storage medium and that are capable of being executed by information handling system 500 and/or a similar type of computing platform. Although information handling system 500 represents one example of several types of computing platforms, information handling system 500 may include more or fewer elements and/or different arrangements of elements than shown in FIG. 5, and the scope of the claimed subject matter is not limited in these respects.

Information handling system 500 may comprise one or more processors such as processor 510 and/or processor 512, which may comprise one or more processing cores. One or more of processor 510 and/or processor 512 may couple to one or more memories 516 and/or 518 via memory bridge 514, which may be disposed external to processors 510 and/or 512, or alternatively at least partially disposed within one or more of processors 510 and/or 512. Memory 516 and/or memory 518 may comprise various types of semiconductor based memory, for example volatile type memory and/or non-volatile type memory. Memory bridge 514 may couple to a graphics system 520 to drive a display device (not shown) coupled to information handling system 500.

Information handling system 500 may further comprise input/output (I/O) bridge 522 to couple to various types of I/O systems. I/O system 524 may comprise, for example, a universal serial bus (USB) type system, an IEEE 1394 type system, or the like, to couple one or more peripheral devices to information handling system 500. Bus system 526 may comprise one or more bus systems such as a peripheral component interconnect (PCI) express type bus or the like, to connect one or more peripheral devices to information handling system 500. A hard disk drive (HDD) controller system 528 may couple one or more hard disk drives or the like to information handling system, for example Serial ATA type drives or the like, or alternatively a semiconductor based drive comprising flash memory, phase change, and/or chalcogenide type memory or the like. Switch 530 may be utilized to couple one or more switched devices to I/O bridge 522, for example Gigabit Ethernet type devices or the like. Furthermore, as shown in FIG. 5, information handling system 500 may include a radio-frequency (RF) block 532 comprising RF circuits and devices for wireless communication with other wireless communication devices and/or via wireless networks such as network 100 of FIG. 1, for example where information handling system 500 embodies base station 114 and/or subscriber station 116, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to sleep optimization for mobile devices in a wireless network and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    transmitting over a communication network from a transmitter to a receiver a message that includes a number of frames specifying a duration of a next unavailability interval of a sleep mode operation and further includes an indication of a length of a pseudo unavailability interval portion of the next unavailability interval in the event best effort (BE) data is available to be transmitted over the communication network from the transmitter to the receiver;
    receiving over the communication network at the transmitter from the receiver a one-bit flag indicating a presence of the pseudo unavailability interval portion of the next unavailability interval; and
    transmitting the data over the communication network from the transmitter to the receiver during the pseudo availability interval portion of the next unavailability interval of the sleep mode operation via a pseudo unavailability interval.

2. The method of claim 1, wherein transmitting over the communication network from the transmitter to the receiver comprises transmitting from a base station to a subscriber station.

3. The method of claim 1, wherein transmitting over the communication network from the transmitter to the receiver comprises transmitting from a subscriber station to a base station.

4. The method of claim 1, further comprising, in the event there is additional data to be transmitted, transmitting one or more additional messages over the communication network from the transmitter to the receiver, and transmitting the additional data over the communication network from the transmitter to the receiver via one or more additional pseudo unavailability intervals until there is no additional data to be transmitted.

5. The method of claim 1, further comprising:
    determining a needed length of the next unavailability interval; and
    if the needed length of the pseudo unavailability interval to transmit the data is greater than a length of the next unavailability interval, determining a number of sleep cycles to accommodate the needed length of the pseudo unavailability interval; and
    executing said transmitting the data during a next unavailability interval of a sleep mode operation via the pseudo unavailability interval for the determined number of sleep cycles.

6. The method of claim 1, wherein the message specifies a calculation method for calculating a length of the next unavailability interval, the calculation method comprising:
    setting the length of the next unavailability interval to a length of a current unavailability interval;
    calculating the length of the next unavailability interval based at least in part on a formula that successively increases the length of the unavailability interval in the absence of further traffic;
    setting the length of the next unavailability interval to a fraction of a length of the current unavailability interval;
    setting the length of the next unavailability interval based at least in part on existing traffic class or expected traffic class, or combinations thereof; or
    setting the length of the next unavailability interval independent of the length of the current unavailability interval; or combinations thereof.

7. The method of claim 1, wherein the message is transmitted over the communication network from the transmitter to the receiver as part of a traffic indicator message, as a sub-header to a media access control message, as a separate media access control message, as a portion of a generic media access control header, or combinations thereof.

8. The method of claim 1, wherein the message comprises an indicator whether a duration of the next pseudo unavailability interval is based at least in part on a duration of a previous pseudo unavailability interval for the data to be transmitted.

9. The method of claim 1, further comprising returning to a normal sleep mode operation after the data has been transmitted.

10. The method of claim 1, further comprising remaining in a sleep mode for a predetermined duration.

11. An apparatus, comprising:
    a processor; and
    a memory coupled to the processor, the memory having instructions stored thereon that, if executed, are capable of configuring the processor to:
    transmit over a communication network from a transmitter to a receiver a message that includes a number of frames specifying a duration of a next unavailability interval of a sleep mode operation and further includes an indication of a length of a pseudo unavailability interval portion of the next unavailability interval in the event data is available to be transmitted over the communication network from the transmitter to the receiver;
    receive over the communication network at the transmitter from the receiver a one-bit flag indicating a presence of the pseudo unavailability interval portion of the next unavailability interval; and
    transmit the data over the communication network from the transmitter to the receiver during the pseudo unavailability interval portion of the next unavailability interval of the sleep mode operation via a pseudo unavailability interval.

12. The apparatus of claim 11, wherein the transmitter comprises a base station and the receiver comprises a subscriber station.

13. The apparatus of claim 11, wherein the transmitter comprises a subscriber station and the receiver comprises a base station.

14. The apparatus of claim 11, wherein the instructions, if executed, are further capable of configuring the processor to determine a length of the next unavailability interval and transmit the length of the next unavailability interval as part of the message.

15. The apparatus of claim 11, wherein the instructions, if executed, are further capable of configuring the processor to, in the event there is additional data to be transmitted, transmit one or more additional messages and transmit the additional data via one or more additional pseudo unavailability intervals until there is no additional data to be transmitted.

16. The apparatus of claim 11, wherein the instructions, if executed, are further capable of configuring the processor to:

determine a length of the next unavailability interval; and if the needed length of the pseudo unavailability interval to transmit the data is greater than the length of the next unavailability interval, determine a number of sleep cycles to accommodate the needed length of the pseudo unavailability interval; and transmit the data during a next unavailability interval of a sleep mode operation via the pseudo unavailability interval for the determined number of sleep cycles.

17. A system, comprising:

a transmitter; and an antenna associated with the transmitter, wherein the transmitter is configured to:

transmit over a communication network from a transmitter to a receiver a message that includes a number of frames specifying a duration of a next unavailability interval of a sleep mode operation and further includes an indication of a length of a pseudo unavailability interval portion of the next unavailability interval in the event data is available to be transmitted over the communication network from the transmitter to the receiver;

receive over the communication network at the transmitter from the receiver a one-bit flag indicating a presence of the pseudo unavailability interval portion of the next unavailability interval; and transmit the data over the communication network from the transmitter to the receiver during the pseudo unavailability interval portion of the next unavailability interval of the sleep mode operation via a pseudo unavailability interval.

18. The system of claim 17, wherein the transmitter comprises a base station and the receiver comprises a subscriber station.

19. The system of claim 17, wherein the transmitter comprises a subscriber station and the receiver comprises a base station.

\* \* \* \* \*